United States Patent [19]

Liao

[11] Patent Number: 5,381,708
[45] Date of Patent: Jan. 17, 1995

[54] PEDAL ASSEMBLY FOR A BICYCLE

[76] Inventor: Wan M. Liao, No. 200, Heng Chun Rd., Ta Chia Chen, Taichung Hsien,

[21] Appl. No.: 119,500

[22] Filed: Sep. 10, 1993

[51] Int. Cl.⁶ .................................. G05G 1/14
[52] U.S. Cl. ..................... 74/594.6; 74/594.4; 36/131
[58] Field of Search ............. 74/594.4–594.6; 36/131, 132

[56] References Cited

U.S. PATENT DOCUMENTS

| | | | |
|---|---|---|---|
| 4,864,887 | 9/1989 | Rapisarda | 74/594.6 |
| 4,898,063 | 2/1990 | Sampson | 74/594.6 |
| 4,947,708 | 8/1990 | Lacombe | 74/594.4 X |
| 5,048,369 | 9/1991 | Chen | 74/594.6 |
| 5,079,968 | 1/1992 | Starner | 74/594.6 |
| 5,081,883 | 1/1992 | Romano | 36/131 X |
| 5,142,938 | 9/1992 | Sampson | 74/594.6 |

FOREIGN PATENT DOCUMENTS

| | | | |
|---|---|---|---|
| 0485956 | 5/1992 | European Pat. Off. | 74/594.6 |
| 2644129 | 9/1990 | France | 74/594.6 |
| 4-71980 | 3/1992 | Japan | 74/594.6 |
| 2239779 | 7/1991 | United Kingdom | 74/594.6 |

*Primary Examiner*—Vinh T. Luong
*Attorney, Agent, or Firm*—Knobbe, Martens, Olson & Bear

[57] ABSTRACT

A pedal assembly for a bicycle includes a pedal and an adapter plate. The pedal has first and second ends each having a fixing device formed thereon for obtaining the adapter plate. The adapter plate has first and second ends and a plurality of attaching elements formed on an upper side thereof so as to be attachable to a sole of a footwear of a cyclist, an edge extending horizontally and inwardly from each of the ends of the adapter plate. The adapter plate can be releasably mounted onto the pedal and be retained between the fixing device.

1 Claim, 3 Drawing Sheets

PEDAL ASSEMBLY FOR A BICYCLE

BACKGROUND OF THE INVENTION

The present invention relates to a pedal assembly for a bicycle, more particularly, to a pedal with a resilient element formed in an end of the pedal having a fixing means to retain an adapter plate attached to a sole of a footwear of a cyclist.

The present invention intends to provide a pedal assembly for a bicycle having a resilient element formed on a side of the pedal which can retain the adapter plate with ease and allow motion of the adapter plate or ankle of the cyclist with limited angles by deformation of the resilient element.

Prior art pedals of a bicycle now in use are pivoted to crank arm, a cyclist puts his or her shoe on the pedal and exerts force onto the pedal to revolve the crank arm to make bicycle move. A typical pedal is a flat element providing an upper surface for cyclist's shoe pressing thereon. Such a structure of the pedal may cause a slip especially when cyclist exerts force off the center line of the pedal, which may causes a serious injury.

Some competition bicycles utilize a toe clip, which is a fastening belt, to secure footwear of a cyclist on the pedal to avoid the slip mentioned above. However, the processes of using the toe clip are complicated as a cyclist must bend down first and unfasten the toe clip, then fasten it after his or her shoe is inserted, and then straighten his or her body so he or she can operate the pedal. The processes take too much time, which is one of the serious faults of this type of pedal, and such fault still exists when the cyclist wants to unfasten his or her shoe from the toe clip. Further, the shoe of the cyclist is not allowed to change its orientation because of the tight fastening by the toe clip in the beginning, this will be a shortcoming in a long distance riding.

SUMMARY OF THE INVENTION

The present invention provides a pedal assembly including a pedal and an adapter plater. The pedal has first and second ends, each end having a fixing means formed thereon. A resilient element is formed integrally from the pedal and forms a free end on second end of the pedal, a space being formed between a bottom of the pedal and the free end. The adapter plate has first and second ends and from each end an edge extends horizontally and inwardly from a vertical surface thereof. The adapter plate can be releasably mounted onto the pedal and be retained between the fixing means.

It is an object of the present invention to provide a footwear retaining means with easy operating processes for a cyclist.

It is still another object of the present invention to provide a time-saving pedal assembly such that all a cyclist needs to do is just mount the adapter plate, which is attachable to a sole of footwear, into the pedal.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
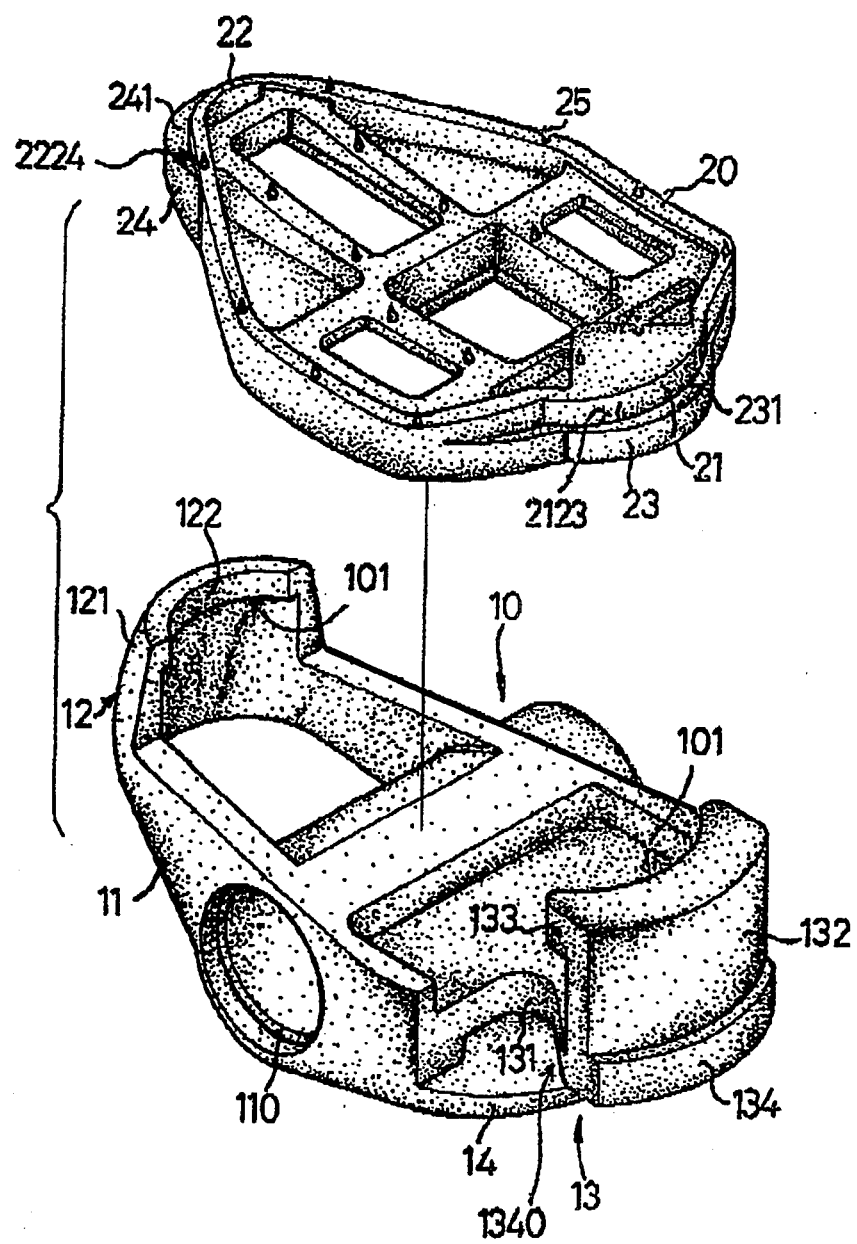
FIG. 1 is a perspective view of a pedal and an adapter plate in accordance with the present invention.
Figure 2:
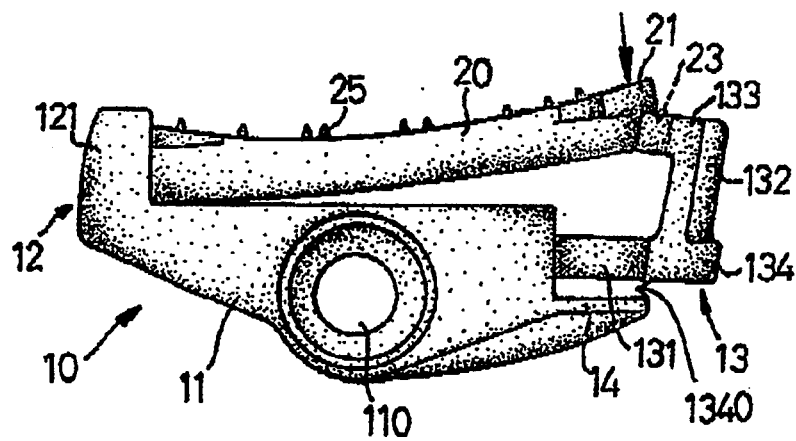
FIG. 2 is a side elevational view of an adapter plate engaged under a shoe, being inserted into the pedal in accordance with the present invention.
Figure 3:
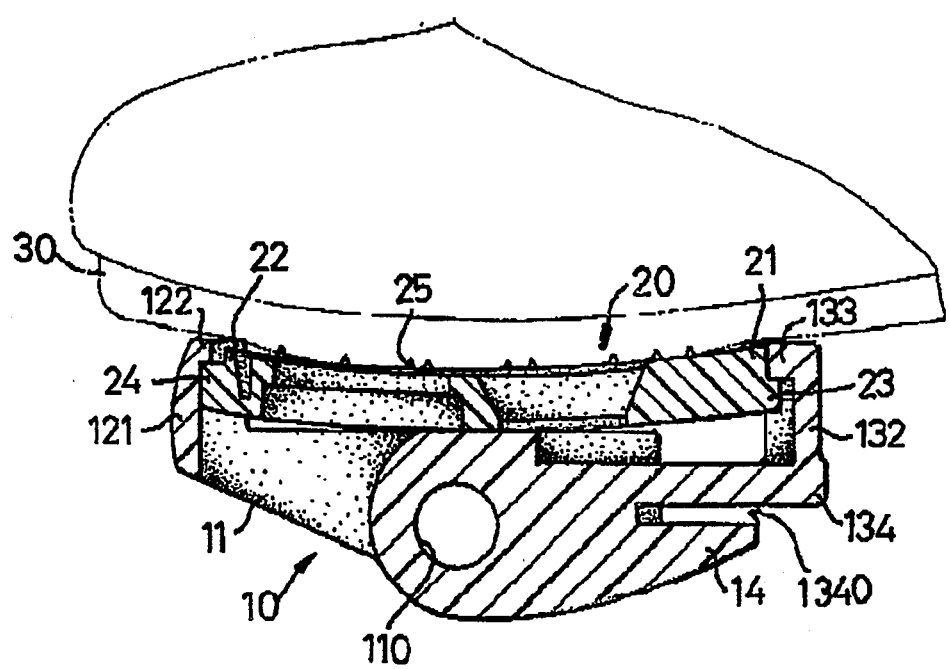
FIG. 3 is a side elevational view, partly in section, the adapter plate fitted into the pedal in accordance with the present invention.

Referring to the drawings and initially to FIGS. 1 through 3, a pedal 10 in accordance with the present invention includes a body 11 having a fixing means 101 formed on first and second ends 12, 13 and a through hole 110 extending transversely in a middle thereof for receiving a bicycle crank arm (not shown). The first end 12 has an arciform wall 121 extending upwards and having a flange 122 extending horizontally and inwardly from an upper end thereof. The second end 13 has a free end 134 of a resilient element 131 which is formed integrally from the body 11 of the pedal 10, the free end 134 has a space 1340 from a bottom 14 of the pedal 10. An arciform wall 132 extends upwardly from an upper side of the free end 134 of the resilient element 131 and has a flange 133 extending horizontally and inwardly from an upper end thereof.

An adapter plate 20 includes a plurality of attaching means 25 so as to be attached to a sole 30 of a footwear, and first and second ends 21, 22, each of the ends having edges 23, 24 extending horizontally and outwardly from the vertical side thereof, and shoulder surfaces 231, 241 are formed an abutments 2123, 2224 of the vertical sides and the edges 23, 24.

Figure 4:
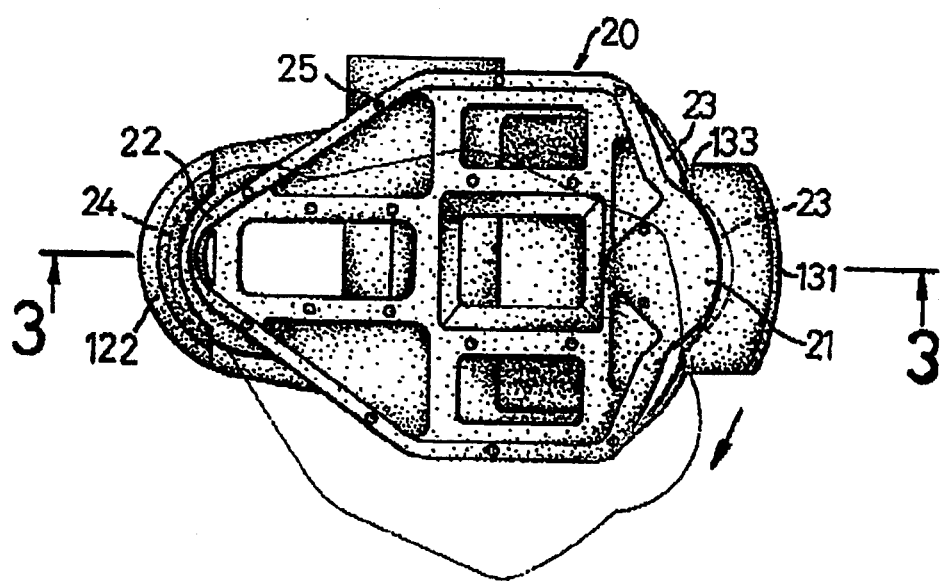
FIG. 4 is a top elevational view of the adapter plate fitted into the pedal where the motion of the adapter plate is shown by dotted line.

When in use, a cyclist inserts the edge 241 of the adapter plate 20 into a portion below the flange 122 of the wall 121, then presses the edge 23 downwards towards the resilient element 131 which is pushed downwardly and the wall 132 being temporarily displaced due to the insertion of the adapter plate 20. The adapter plate 20 is retained in the pedal 10 by the shoulder surfaces 231, 241 contacting against the lower face portion of the flanges 122, 133. The adapter plate 20 is allowed to revolve about either ends thereof to a limited angle within arc length of the flanges 122, 133 to release tension of cyclist's ankle, as shown in FIG. 4. The resilient element 131 also can be deformed by pressing downward or pressing a side of the adapter plate 20.

While the present invention has been explained in relation to its preferred embodiment, it is to be understood that many other possible modifications and variations can be made without departing from the spirit and scope of the invention as hereinafter claim.

I claim:

1. A pedal assembly for a bicycle comprising:
   a pedal including first and second ends, said second end of said pedal including a resilient element extending from said pedal and forming a free end on a distal end of said pedal with said free end being spaced apart from a bottom of said pedal;
   a fixing means being formed on each of said first and second ends of said pedal, and comprising a wall extending upward from said first end of said pedal and from said free end of said resilient element, respectively, said walls each having a flange with an arciform inner side, the flanges extending horizontally from said inner side thereof; and an adapter plate including an attaching means formed on an upper side thereof so as to be attached to a sole of a footwear of a cyclist, and said adapter plate being releasably mounted into said pedal assembly and being retained between said fixing means wherein said adapter plate includes first and second end, each end having an edge extending horizontally therefrom, a shoulder surface being formed on an abutment area between said end and said edge of each of said ends.

* * * * *